(12) United States Patent
Lin et al.

(10) Patent No.: US 10,999,832 B2
(45) Date of Patent: May 4, 2021

(54) SIGNAL TRANSMISSION METHOD, TERMINAL DEVICE AND NETWORK DEVICE FOR RESOURCE RESERVATION (71) Applicant: Guangdong OPPO Mobile Telecommunications Corp., Ltd., Guangdong (CN)

(72) Inventors: Yanan Lin, Guangdong (CN); Hua Xu, Ottawa (CA)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/474,305

(22) PCT Filed: Dec. 29, 2016

(86) PCT No.: PCT/CN2016/112968
§ 371 (c)(1),
(2) Date: Jun. 27, 2019

(87) PCT Pub. No.: WO2018/119851
PCT Pub. Date: Jul. 5, 2018

(65) Prior Publication Data
US 2019/0342867 A1 Nov. 7, 2019

(51) Int. Cl.
H04W 72/04 (2009.01)
H04L 1/00 (2006.01)
(Continued)

(52) U.S. Cl.
CPC ......... H04W 72/042 (2013.01); H04L 1/0013 (2013.01); H04L 5/0051 (2013.01);
(Continued)

(58) Field of Classification Search
None
See application file for complete search history.

(56) References Cited

U.S. PATENT DOCUMENTS

2008/0212701 A1* 9/2008 Pan ............... H04B 7/0452
375/260
2012/0207123 A1* 8/2012 Seo ............... H04W 72/0413
370/329
(Continued)

FOREIGN PATENT DOCUMENTS

CN 101808409 A 8/2010
CN 103002585 A 3/2013
(Continued)

OTHER PUBLICATIONS

English Translation of Chinese Office Action for Chinese Application No. 201680091963.4 dated Mar. 13, 2020.
(Continued)

Primary Examiner — Anh Ngoc M Nguyen (57) ABSTRACT

A signal transmission method, a terminal device and a network device are provided. The method includes: a terminal device receives downlink control information, (DCI), the DCI carries resource reservation indication information, and the resource reservation indication information indicates the terminal device whether reserve a physical resource is to be reserved in a time-domain resource unit; the terminal device determines a first physical resource used for transmitting a first signal in the time-domain resource unit according to the resource reservation indication information, or determines a second physical resource used for an uplink and downlink guard period in the time-domain resource unit according to the resource reservation indication information.

18 Claims, 5 Drawing Sheets (51) Int. Cl.
  *H04L 5/00* (2006.01)
  *H04L 25/02* (2006.01)
  *H04L 27/26* (2006.01)
  *H04W 28/26* (2009.01)

(52) U.S. Cl.
  CPC ...... *H04L 25/0226* (2013.01); *H04L 27/2607* (2013.01); *H04W 28/26* (2013.01); *H04W 72/0446* (2013.01)

(56) References Cited

U.S. PATENT DOCUMENTS

| | | | |
|---|---|---|---|
| 2014/0219202 A1 | 8/2014 | Kim et al. | |
| 2015/0092563 A1 | 4/2015 | Tabet et al. | |
| 2018/0007673 A1* | 1/2018 | Fwu | H04W 4/70 |
| 2018/0359057 A1* | 12/2018 | Yang | H04L 5/00 |
| 2019/0223175 A1* | 7/2019 | Hakola | H04W 72/0446 |

FOREIGN PATENT DOCUMENTS

| | | |
|---|---|---|
| CN | 103621168 A | 3/2014 |
| CN | 104168610 A | 11/2014 |
| EP | 2858446 A1 | 4/2015 |
| EP | 3471491 A1 | 4/2019 |
| JP | 2013509129 A | 3/2013 |
| JP | 2016174432 A | 9/2016 |
| JP | 2016529807 A | 9/2016 |
| JP | 2017517930 A | 6/2017 |
| RU | 2337505 C2 | 10/2008 |
| WO | 2011120316 A1 | 10/2011 |
| WO | 2014089782 A1 | 6/2014 |
| WO | 2015160184 A1 | 10/2015 |
| WO | 2017222277 A1 | 12/2017 |

OTHER PUBLICATIONS

English Translation of Chilean Office Action for Chilean Application No. 201901817 dated Mar. 18, 2020.
3GPP TSG RAN WG1 #87; R1-1612400; Reno, USA; Nov. 14-18, 2016; 3 pages.
Extended EP Search Report for EP16925323.4 dated Oct. 28, 2019.
Canada Office Action for CA application 3048665 dated Jul. 29, 2020.
European Examination for EP application 16925323.4 dated Jul. 13, 2020.
English translation of Russia Office Action for RU application 2019123483 dated May 12, 2020.
Brazil Office Action with English Translation for BR Application BR112019013622-3 dated Sep. 24, 2020.
India Office Action and English Translation for in Application 201917026585 dated Aug. 18, 2020.
3GPP TSG RAN WG1 #87 R1 1612428; Reno, USA Nov. 14-18, 2016.
3GPP TSG RAN WG1 #87; Reno, USA; Nov. 14-18, 2016; R1-1612525.
Communication pursuant to Article 94(3) EPC Examination for EP Application 16925323.4 dated Nov. 23, 2020.
Singapore First Written Opinion for SG Application 11201905975R dated Oct. 27, 2020.
Japan Office Action with English Translation for JP Application 2019535759 dated Dec. 4, 2020.
3GPP TSG RAN WG1 Meeting #87; Reno, USA, Nov. 14-18, 2016; R1-1611206.
3GPP TSG RAN WG1 Meeting #87; Reno, USA Nov. 14-18, 2016; R1-1611780.
Taiwan First Office Action with English Translation for TW Application 11020244680 dated Mar. 19, 2021.

\* cited by examiner

A network device determines downlink control Information, the downlink control information carries resource reservation indication information, and the resource reservation indication information indicates a terminal device whether to reserve a physical resource in a time-domain resource unit ~S610

The network device sends the downlink control information to the terminal device, so that the terminal device determines a first physical resource used for transmitting a first signal in the time-domain resource unit or determines a second physical resource used for an uplink and downlink guard period in the time-domain resource unit according to the resource reservation indication information ~S620

SIGNAL TRANSMISSION METHOD, TERMINAL DEVICE AND NETWORK DEVICE FOR RESOURCE RESERVATION

CROSS-REFERENCE TO RELATED APPLICATION(S)

This application is a 371 application of International Application No. PCT/CN2016/112968, filed on Dec. 29, 2016, the entire disclosure of which is hereby incorporated by reference.

TECHNICAL FIELD

Implementations of the present application relate to the field of communication, and more particularly, relate to a signal transmission method, a terminal device, and a network device.

BACKGROUND

In a scenario in which a Sounding Reference Signal (SRS) is transmitted aperiodically in Long Term Evolution (LTE), generally a network device pre-configures an SRS resource to a terminal device. Regardless of whether the SRS resource is used for transmitting the SRS, the terminal device needs to reserve the SRS resource for the SRS, and the reserved SRS resource cannot be used for transmissions of other data. For example, when a bandwidth for Physical Uplink Control Channel (PUCCH) transmission of the terminal conflicts with a bandwidth of the SRS resource, the terminal device may truncate the PUCCH and still reserve the last Orthogonal Frequency Division Multiplexing (OFDM) symbol for SRS transmission.

However, since in the scenario in which the SRS is transmitted aperiodically, the terminal device transmits the SRS after receiving a trigger signaling, that is, the SRS resource reserved by the terminal device may be not used to transmit the SRS, thus the reserved SRS resource causes a waste of resources.

SUMMARY

An implementation of the present application provides a signal transmission method, which can improve a resource utilization rate.

In a first aspect, a signal transmission method is provided. The method includes: a terminal device receives downlink control information (DCI). The DCI carries resource reservation indication information, and the resource reservation indication information indicates the terminal device whether a physical resource is to be reserved in a time-domain resource unit. The terminal device determines a first physical resource used for transmitting a first signal in the time-domain resource unit according to the resource reservation indication information, or determines a second physical resource used for an uplink and downlink guard period in the time-domain resource unit, according to the resource reservation indication information.

In some possible implementations, the DCI is used for indicating the terminal device to transmit the first signal through the time-domain resource unit.

The DCI may be used for indicating the terminal device to transmit the first signal through the time-domain resource unit. The resource reservation indication information may be carried through the DCI, to indicate the terminal device whether a physical resource is to be reserved in the time-domain resource unit, thereby enabling the terminal device to fully utilize the physical resource and improving the resource utilization rate.

In some possible implementations, the downlink control information is common downlink control information or group downlink control information. The common downlink control information is information transmitted in a common search space of a downlink control channel. The group downlink control information is information that is transmitted to each terminal device in a terminal device set including multiple terminal devices.

The DCI may be common downlink control information or group downlink control information, i.e., the common downlink control information or group downlink control information carries resource reservation indication information, and the resource reservation indication information is used for indicating to the terminal device whether a physical resource is to be reserved in a time-domain resource unit, thereby enabling the terminal device to fully utilize the physical resource and improving the resource utilization rate.

In some possible implementations, when the resource reservation indication information indicates the terminal device that a physical resource is not to be reserved in the time-domain resource unit, determining, by the terminal device, the first physical resource used for transmitting the first signal in the time-domain resource unit according to the resource reservation indication information, or determining the second physical resource used for the uplink and downlink guard period in the time-domain resource unit according to the resource reservation indication information, includes: the terminal device determines the first physical resource or the second physical resource in the time-domain resource unit.

When the resource reservation indication information indicates the terminal device that a physical resource is to be reserved in the time-domain resource unit, the terminal device may determine the first physical resource or the second physical resource in all physical resources in the time-domain resource unit, thereby improving the resource utilization rate.

In some possible implementations, when the resource reservation indication information indicates the terminal device that a physical resource is to be reserved in the time-domain resource unit, determining, by the terminal device, the first physical resource used for transmitting the first signal in the time-domain resource unit according to the resource reservation indication information, or determining the second physical resource used for the uplink and downlink guard period in the time-domain resource unit according to the resource reservation indication information, includes: the terminal device determines a physical resource to be reserved in the time-domain resource unit according to the resource reservation indication information; and the terminal device determines the first physical resource or the second physical resource in other physical resources except the reserved physical resource in the time-domain resource unit.

The terminal device determines a size of the physical resource to be reserved according to the resource reservation indication information, and the terminal device may determine the first resource used for transmitting the first signal or the second physical resource used for the uplink and downlink guard period in physical resources other than the reserved physical resource in the time-domain resource unit, thereby avoiding resource conflicts.

In some possible implementations, when the resource reservation indication information indicates the terminal device that a physical resource is to be reserved in the time-domain resource unit, the resource reservation indication information includes a location and/or a size of the physical resource that the terminal device is to reserve.

The terminal device can accurately determine the physical resource to be reserved according to the location and/or size of the physical resource to be reserved included in the resource reservation indication information, thus the terminal device can accurately determine the first resource for transmitting the first signal in the physical resources other than the reserved physical resource in the time-domain resource unit, thereby further improving the resource utilization rate.

In some possible implementations, determining, by the terminal device, the first physical resource in other physical resources except the reserved physical resource in the time-domain resource unit, includes: the terminal device determines the first physical resource including a location of an Orthogonal Frequency Division Multiplexing (OFDM) symbol for sending a demodulation reference signal (DMRS) and/or a number of OFDM symbols for sending the DMRS signal in the other physical resources except the reserved physical resource in the time-domain resource unit.

If the first signal is a DMRS signal, the terminal device determines the first physical resource including a location of an OFDM symbol for sending the DMRS signal and/or a number of OFDM symbols for sending the DMRS signal in other physical resources except the reserved physical resource in the time-domain resource unit. Therefore, the terminal device can accurately determine the first physical resource, avoid interferences among signals, and improve the resource utilization rate.

In some possible implementations, the method further includes: the terminal device performs rate matching processing or puncturing processing on the first signal according to the first physical resource; and the terminal device transmits the first signal on which the rate matching processing or puncturing processing is performed.

If the terminal device uses the first resource to transmit the first signal, specifically the terminal device needs to perform rate matching processing or puncturing processing on the first signal according to the first physical resource, and finally sends the processed first signal.

In some possible implementations, the reserved physical resource is a physical resource for transmitting an uplink reference signal or a downlink reference signal.

The reserved physical resource may be used for transmitting an uplink reference signal or transmitting a downlink reference signal.

In some possible implementations, the first signal is a physical uplink shared channel (PUSCH), or a physical uplink control channel (PUCCH), or a physical downlink control channel (PDCCH), or a physical downlink shared channel (PDSCH), or a sounding reference signal (SRS), or a channel state indication reference signal (CSI-RS), or a demodulation reference signal (DMRS), or a phase tracking signal (PTS), or a beam reference signal (BRS).

In some possible implementations, determining, by the terminal device, the second physical resource used for the uplink and downlink guard period in the time-domain resource unit according to the resource reservation indication information, includes: the terminal device determines a location and/or a length of the uplink and downlink guard period in the time-domain resource unit according to the resource reservation indication information.

The terminal device may determine the physical resource for transmitting the first signal according to the resource reservation indication information, and may also accurately determine the physical resource to be reserved according to the resource reservation indication information. If the reserved physical resource is used for the uplink and downlink guard period, the terminal device may accurately determine the location and/or the length of the uplink and downlink guard period.

In a second aspect, a signal transmission method is provided. The method includes: a network device determines downlink control information (DCI). The downlink control information carries resource reservation indication information, and the resource reservation indication information indicates a terminal device whether a physical resource is to be reserved in a time-domain resource unit. The network device sends the downlink control information to the terminal device, so that the terminal device determines a first physical resource used for transmitting a first signal in the time-domain resource unit or determines a second physical resource used for an uplink and downlink guard period in the time-domain resource unit according to the resource reservation indication information.

In some possible implementations, the DCI is used for indicating the terminal device to transmit the first signal through the time-domain resource unit.

In some possible implementations, when the resource reservation indication information indicates the terminal device that is a physical resource is to be reserved in the time-domain resource unit, the resource reservation indication information includes a location and/or a size of the physical resource that the terminal device is to reserve.

In some possible implementations, the first signal is a demodulation reference signal (DMRS), and the first physical resource includes a location of an OFDM symbol for sending the DMRS signal and/or a number of OFDM symbols for sending the DMRS signal.

In some possible implementations, the downlink control information is common downlink control information or group downlink control information. The common downlink control information is information transmitted in a common search space, and the group downlink control information is information that is transmitted to each terminal device in a terminal device set including multiple terminal devices.

In some possible implementations, the reserved physical resource is a physical resource for transmitting an uplink reference signal or a downlink reference signal.

In some possible implementations, the first signal is a physical uplink shared channel (PUSCH), or a physical uplink control channel (PUCCH), or a physical downlink control channel (PDCCH), or a physical downlink shared channel (PDSCH), or a sounding reference signal (SRS), or a channel state indication reference signal (CSI-RS), or a demodulation reference signal (DMRS), or a phase tracking signal (PTS), or a beam reference signal (BRS).

In a third aspect, a terminal device is provided. The terminal device includes modules that perform the method in the first aspect or any possible implementation of the first aspect.

In a fourth aspect, a network device is provided. The network device includes modules that perform the method in the second aspect or any possible implementation of the second aspect.

In a fifth aspect, a signal transmission system is provided. The signal transmission system includes the terminal device of the third aspect and the network device of the fourth aspect.

In a sixth aspect, a terminal device is provided. The terminal device includes a processor and a storage. The storage stores a program, and the processor executes the program to perform the signal transmission method according to the first aspect or any possible implementation of the first aspect above.

In a seventh aspect, a network device is provided. The network device includes a processor and a storage. The storage stores a program, and the processor executes the program to execute the signal transmission method according to the second aspect or any possible implementation of the second aspect above.

In an eighth aspect, a computer storage medium is provided. The computer storage medium stores program codes, and the program codes are used for instructing to perform the signal transmission method in the first aspect or any possible implementation of the first aspect.

In a ninth aspect, a computer storage medium is provided. The computer storage medium stores program codes, and the program codes are used for instructing to perform the signal transmission method in the second aspect or any possible implementation of the second aspect.

DETAILED DESCRIPTION

The technical solutions in implementations of the present application will be described below with reference to the drawings in the implementations of the present application.

Figure 1:
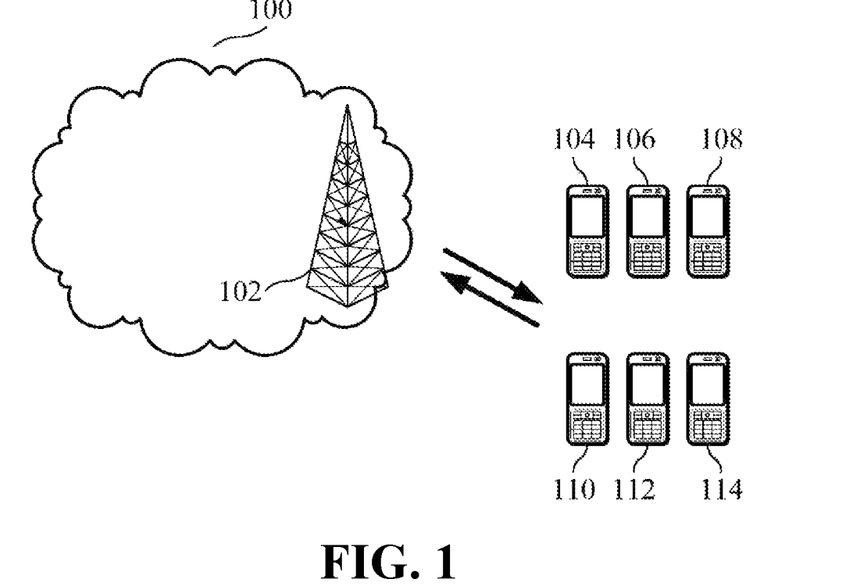
FIG. 1 is a schematic diagram of a communication system according to an implementation of the present application.

FIG. 1 is a schematic diagram of a communication system to which an implementation of the present application is applied. As shown in FIG. 1, a network 100 may include a network device 102 and terminal devices 104, 106, 108, 110, 112, and 114. The network device and the terminal devices are connected in a wireless way. It should be understood that FIG. 1 is only illustrated by taking a network including one network device as an example, but the implementations of the present application are not limited thereto. For example, the network may include more network devices. Similarly, the network may include more terminal devices, and the network devices may also include other devices.

Various implementations are described herein in connection with a terminal device. The terminal device may also refer to a User Equipment (UE), an access terminal, a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device or other processing device connected to a wireless modem, an on-board device, a wearable device, a terminal device in a future 5G network, or a terminal device in a future evolving Public Land Mobile Network (PLMN), etc.

Various implementations are described herein in connection with a network device. The network device may be a device for communicating with a terminal device, and the network device may be a Base Transceiver station (BTS) in a Global System for Mobile Communications (GSM) or a Code Division Multiple Access (CDMA) system, a NodeB (NB) in a Wideband Code Division Multiple Access (WCDMA) system, an Evolutional NodeB (eNB or eNodeB) in an LTE system, or a wireless controller in a scenario of a Cloud Radio Access Network (CRAN). Or the network device may be a relay station, an access point, an on-board device, a wearable device, a network device in a future 5G network, or a network device in a future evolved PLMN, etc.

At present, SRS transmission modes mainly include periodic SRS transmission and aperiodic SRS transmission. In the periodic SRS transmission, the terminal device successively transmits the SRS according to a certain period on a periodic resource pre-configured by the network device. In the aperiodic SRS, the network device triggers the terminal device to perform SRS transmission through a trigger signaling. Usually, the terminal device performs the SRS transmission on a most recent SRS resource after receiving the trigger signaling. An SRS resource set for the aperiodic SRS transmission is also pre-configured by the network device through a high-layer signaling, and the SRS resource set for the aperiodic SRS transmission configured by the network device and an SRS resource set for the periodic SRS transmission configured by the network device are independent of each other. Since aperiodic SRS transmission is more flexible, the aperiodic SRS transmission is more widely applied in the 5G system, and implementations of the present application are mainly applied to the scenario of the aperiodic SRS transmission.

In the scenario of the aperiodic SRS transmission, regardless of whether the terminal device transmits the SRS, the terminal device needs to reserve an SRS resource for the SRS. The SRS resource is still reserved when the terminal device does not transmit the SRS, which causes a waste of resources.

Figure 2:
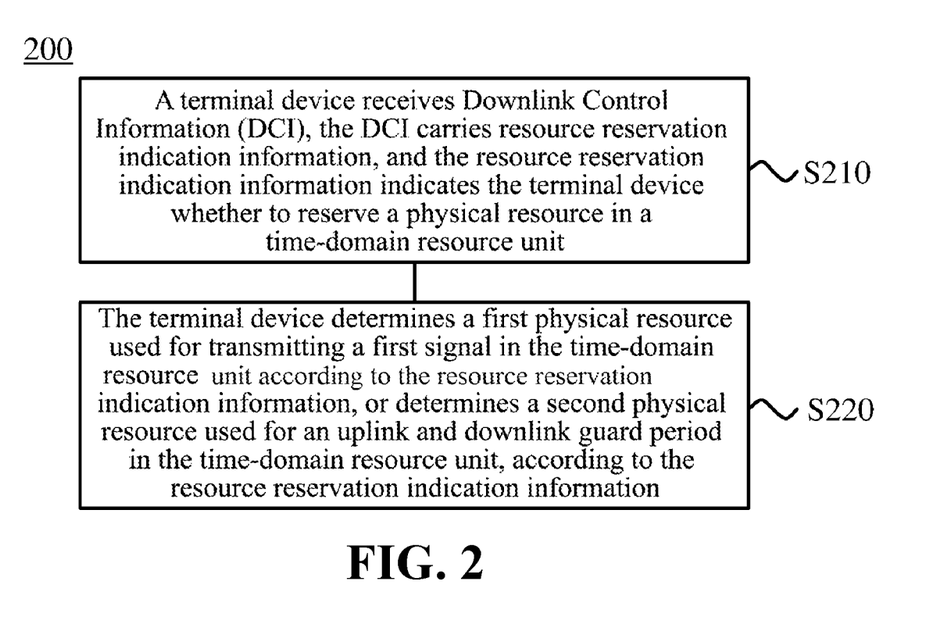
FIG. 2 is a schematic flowchart of a signal transmission method according to an implementation of the present application.

FIG. 2 is a schematic flow chart of a signal transmission method 200 according to an implementation of the present application. The method 200 is performed by a terminal device, such as the terminal device in FIG. 1. As shown in FIG. 2, the method 200 includes the following acts S210-S220.

In S210, the terminal device receives Downlink Control Information (DCI), the DCI carries resource reservation indication information, and the resource reservation indication information indicates the terminal device whether a physical resource is to be reserved in a time-domain resource unit.

In S220, the terminal device determines a first physical resource used for transmitting a first signal in the time-domain resource unit according to the resource reservation indication information, or determines a second physical resource used for an uplink and downlink guard period in the time-domain resource unit, according to the resource reservation indication information.

Specifically, the terminal device receives the DCI. The DCI carries the resource reservation indication information, and the resource reservation indication information indicates the terminal device whether the physical resource is to be reserved in the time-domain resource unit. Here, the time-domain resource unit may be a subframe, a time slot, a mini time slot or an OFDM symbol. The terminal device further determines the first physical resource used for transmitting the first signal in the time-domain resource unit according to whether the physical resource needs to be reserved. Thus, the terminal device determines whether to reserve the physical resource according to the resource reservation indication information carried by the downlink control information sent by the network device, and reserves the physical resource only when reservation is needed, and the physical resource may be used for other signals (e.g., used for the first signal or used for the uplink and downlink guard period) when reservation is not needed, so that the terminal device can fully utilize the physical resource and improve the resource utilization rate.

In addition, when multiple terminal devices use the same bandwidth to transmit signals, it will generate interference between the signals. If at least one terminal device (for example, only one terminal device and denoted as a first terminal device) of the multiple terminal devices needs to send an SRS signal (for convenience of description, "SRS signal" is taken for explanation, and the application is not limited thereto), other terminal devices that use the same bandwidth as that of the SRS signal of the terminal device need to reserve a resource, and the reserved resource is the same as that used by the SRS signal, mainly for the purpose of avoiding the interference to the first signal.

It should be understood that the network device may carry the resource reservation indication information only in one piece of downlink control information, and whether to reserve the resource in multiple successive time-domain resource units of the terminal device is determined according to the resource reservation indication information. Or the network device carries the resource reservation indication information in each downlink control information, and whether to reserve the resource in each resource unit of the terminal device is determined according to corresponding resource reservation indication information. The present application is not limited thereto.

In a specific implementation, the resource reservation indication information may further include indication information of a number of time-domain resource units, and the terminal device determines that resources are to be reserved in subsequent N time-domain resource units according to the indication information of the number of the time-domain resource units.

Optionally, the downlink control information is used for indicating transmission of the first signal on the time-domain resource unit.

If the downlink control information is used for indicating transmission of the first signal through the time-domain resource unit, that is, the downlink control information is DCI for indicating scheduling information of the first signal, then after receiving the downlink control information the terminal device transmits the first signal through the time-domain resource unit according to the downlink control information. But since the downlink control information carries the resource reservation indication information, the terminal device needs to determine whether to reserve a physical resource in the time-domain resource unit.

Optionally, the downlink control information is common downlink control information or group downlink control information, the common downlink control information is information transmitted in a common search space of a downlink control channel, and the group downlink control information is information that is transmitted to each terminal device in a terminal device set including multiple terminal devices.

Specifically, the common downlink control information is scrambled by using a broadcast common Radio Network Temporary Identity (RNTI). The group downlink control information is scrambled by using a group RNTI known to each terminal device in the terminal device set.

Optionally, the resource reservation indication information includes at least one bit. The terminal device and the network device may pre-determine a mapping relationship between a value of the at least one bit and whether to reserve a resource. For example, the resource reservation indication information includes a bit, when the value of the bit is 1, it indicates that a physical resource is to be reserved; and when the value of the bit is 0, it indicates that the physical resource is not to be reserved.

Optionally, if the resource reservation indication information indicates the terminal device that a physical resource is not to be reserved in the time-domain resource unit, the terminal device may determine the first physical resource for transmitting the first signal in the time-domain resource unit.

Optionally, a physical resource to be reserved by the terminal device may be pre-determined by the network device and the terminal device, or may be pre-indicated to the terminal device through a high-level signaling by the network device, or may be indicated to the terminal device through control information.

For example, the terminal device may pre-agree with the network device that the physical resource to be reserved is on the last several OFDM symbols of a time slot, or the first several OFDM symbols of a time slot, or the N OFDM symbols are the last N OFDM symbols that are capable of being used for transmitting data when the first signal is data, or the like.

Optionally, when the resource reservation indication information indicates the terminal device that a physical resource is not to be reserved in the time-domain resource unit, the terminal device may determine the first physical resource or the second physical resource in all physical resources in the time-domain resource unit, thereby improving the resource utilization rate.

Optionally, the terminal device determines a size of the physical resource to be reserved according to the resource reservation indication information, and the terminal device may determine the first physical resource used for transmitting the first signal and the second physical resource used for the uplink and downlink guard period in physical resources other than the reserved physical resource in the time-domain resource unit, thereby avoiding conflicts with other signals and improving the resource utilization rate.

Optionally, the physical resource to be reserved by the terminal device is indicated through the control information, which may carry reservation indication information including a location and/or a size of the physical resource that the terminal device is to reserve. In this way, the terminal device can accurately determine the physical resource to be reserved, can accurately determine the first resource for transmitting the first signal in physical resources other than the reserved physical resource in the time-domain resource unit, and improve the resource utilization rate.

Optionally, if the first signal is a DMRS signal, the terminal device determines the first physical resource including a location of an OFDM symbol and/or a number of OFDM symbols for transmitting the DMRS signal in other physical resources except the reserved physical resource in the time-domain resource unit. That is, the terminal device can accurately determine the OFDM symbols for transmitting the DMRS signal, thereby avoiding interferences among signals, and improving the resource utilization rate.

For example, if a reserved resource for transmitting an SRS occupies an OFDM symbol, the DMRS in the time-domain resource unit has one OFDM symbol less than the DMRS in the time-domain resource unit without reserved SRS resource. Although the SRS resource is reserved, the resources for data transmission are not affected. In another implementation, a DMRS pattern or DMRS time-domain density in the time-domain resource unit with a reserved resource is different from that in the time-domain resource unit without the reserved resource.

Optionally, the physical resource in the implementation of the present application may be a part of time-domain resources or a part of frequency-domain resources in all time-frequency physical resources included in the time-domain resource unit.

Specifically, if the physical resource is a time-domain resource, the time-domain resource may be a time slot, a mini time slot, or an OFDM symbol, or the like, included in the time-domain resource unit. If the physical resource is a frequency-domain resource, the frequency-domain resource may specifically be a frequency-domain resource corresponding to Comb, or a certain PRB set, or a subcarrier set. The present application is not limited thereto.

Optionally, if the time-domain resource unit includes M OFDM symbols, the resource reservation indication information includes N OFDM symbols that the terminal device is to reserve and/or locations of the N OFDM symbols that the terminal device is to reserve, where N is an integer less than or equal to M.

It should be understood that when the resource reservation indication information indicates the terminal device that N OFDM symbols are to be reserved, the N OFDM symbols may be the last N symbols or the first N symbols of the M OFDM symbols. Or when the first signal is data, the N OFDM symbols may be the last N OFDM symbols that are capable of being used for data transmission. The present application is not limited thereto.

Optionally, the resource reservation indication information includes at least one bit, and the terminal device and the network device may pre-determine a mapping relationship between the value of the at least one bit and not reserving an OFDM symbol or the number and/or locations of the OFDM symbols to be reserved. For example, the resource reservation indication information includes two bits. If the value represented by the two bits is 0, it indicates that an OFDM symbol is not to be reserved. If the value represented by the two bits is 1, it indicates that 1 OFDM symbol is to be reserved. If the value represented by the two bits is 2, it indicates that 2 OFDM symbols are to be reserved. If the value represented by the two bits is 3, it indicates that 3 OFDM symbols are to be reserved.

It should be understood that the resource reservation indication information may include 3 bits and a bitmap may be used to indicate which OFDM symbols are to be reserved, which is not limited in the present application.

Optionally, the terminal device performs a rate matching processing or puncturing processing on the first signal according to the first physical resource, and then sends the processed first signal. A time-domain density or pattern obtained by processing the first signal by the terminal device through the first physical resource obtained after reserving the physical resource is different from that through the first physical resource obtained without reserving the physical resource, but the data transmission of the first signal is not affected.

For example, if the terminal device determines that a resource including N OFDM symbols are to be reserved, the first physical resource obtained when the resource reservation indication information indicates the terminal device that N OFDM symbols are to be reserved, is N OFDM symbols less than that obtained when the resource reservation indication information indicates the terminal device that OFDM symbols are not to be reserved.

Optionally, if the physical resource reserved by the terminal device is used for transmitting a control channel, the terminal device may perform the rate matching or punching processing on the control channel according to the reserved resource.

Optionally, the first signal may be a data channel, a control channel, or an SRS, a channel state indication reference signal (CSI-RS), a demodulation reference signal (DMRS), a Phase Tracking Signal (PTS), or a Beam specific Signal (BRS), etc. Specifically, the data channel may be a Physical Downlink Shared Channel (PDSCH), or a Physical Uplink Shared Channel (PUSCH). The control channel may be a Physical Uplink Control Channel (PUCCH), or a Physical Downlink Control Channel (PDCCH).

Optionally, when the first signal is a DMRS signal, the first physical resource includes a location of an OFDM symbol for sending the DMRS signal and/or a number of OFDM symbols for sending the DMRS signal.

Optionally, the reserved physical resource may be a physical resource for transmitting an uplink reference signal or a downlink reference signal.

Preferably, the uplink reference signal may be an SRS, and the downlink reference signal may be a CSI-RS. The reserved resource for transmitting the uplink reference signal or the downlink reference signal are not necessarily used for reference signal transmission of the terminal device, but may be reserved for reference signal transmissions of other terminals, so that, when the other terminals have an aperiodic reference signal that is scheduled dynamically, mutual interference of the aperiodic reference signal and other signals can be avoided.

Optionally, the terminal device may determine a location and/or a length of the uplink and downlink guard period in the time-domain resource unit according to the resource reservation indication information.

Figure 3:
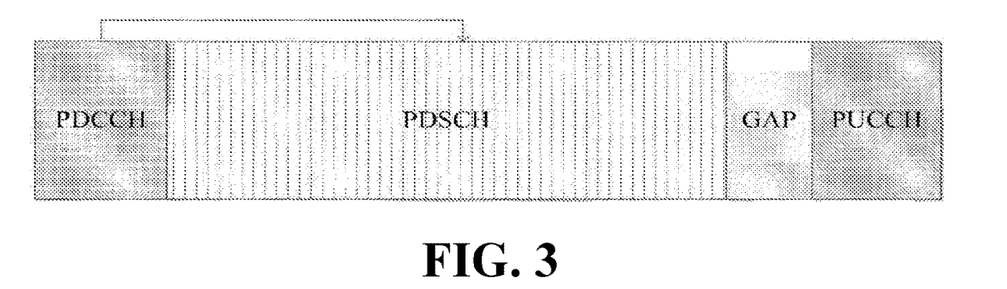
FIG. 3 is a schematic diagram of a slot structure according to an implementation of the present application.
Figure 4:
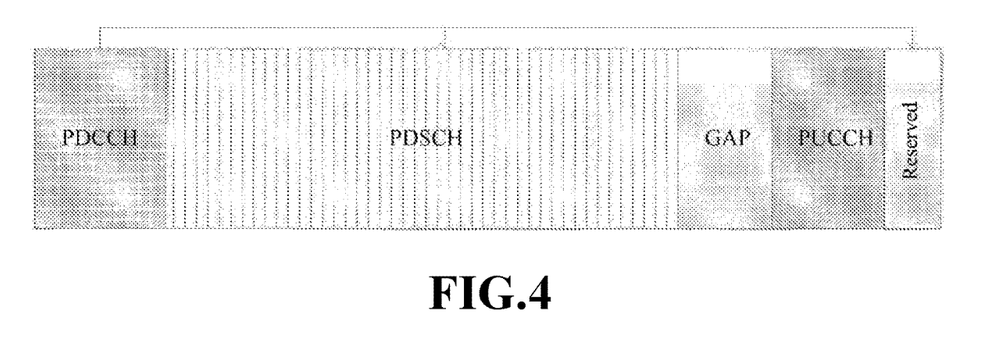
FIG. 4 is a schematic diagram of a slot structure according to another implementation of the present application.

For example, if the first signal is a PDSCH, and there are both an uplink signal and a downlink signal in the time-domain resource unit, an uplink and downlink guard period (denoted as GAP) is configured between the uplink signal and downlink signal, and the guard period is used for the terminal device to switch between uplink transmission and downlink transmission. If the terminal device is not to reserve a physical resource, a location of GAP is shown in FIG. 3, and the slot structure is further used for transmitting a PDCCH and a PUCCH. The present application is not limited thereto. When the terminal device is to reserve a physical resource, a part of a physical resource for transmitting a PDSCH is divided to the first signal, and in this case, a location and a length of the GAP are shown in FIG. 4. In addition, the slot structure in FIG. 4 is further used for transmitting a PDCCH and a PUCCH. As can be seen from FIGS. 3 and 4, the terminal device determines the location and length of the GAP according to whether a physical resource needs to be reserved.

Figure 5:
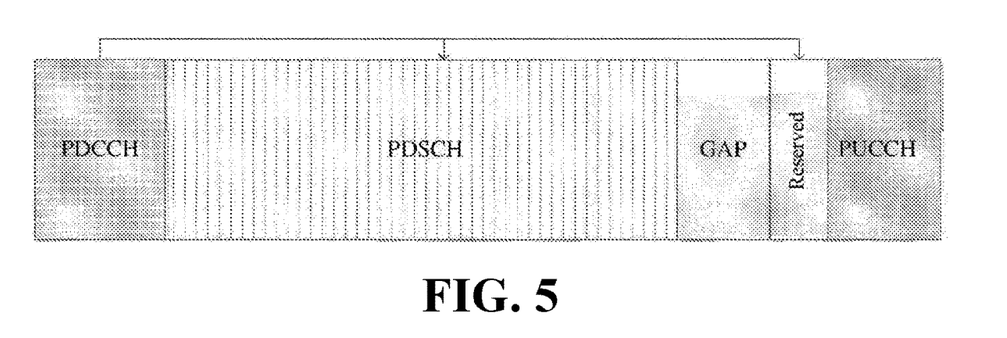
FIG. 5 is a schematic diagram of a slot structure according to yet another implementation of the present application.

In addition, the physical resource reserved by the terminal device may be after a PUCCH, and in this case, the GAP and PUCCH need to be moved forward. Or the physical resource reserved by the terminal device may be before the PUCCH (as shown in FIG. 5), and in this case the GAP needs to be moved forward. If the reserved physical resource is not used to transmit data, it means that the reserved physical resource is used as the GAP, i.e. the GAP is expanded. It is apparent that the length of the uplink and downlink guard period in this case is larger than that of the uplink and downlink guard period in FIG. 4.

An implementation of the present application will be described below with a specific example, but the present application is not limited thereto. A terminal device and a network device pre-agree that a reserved resource occupies a last OFDM symbol of one time slot, downlink control information is used for scheduling transmission of a PUSCH, and a bit carried in the downlink control information indicates whether a resource is to be reserved for an SRS. If a value of the bit indicates that the resource is to be reserved for the SRS, the last OFDM symbol in the time slot for transmitting the PUSCH needs to be reserved, and rate matching is performed on the PUSCH according to other OFDM symbols except the last OFDM symbol in the time slot. If the value of the bit indicates that the resource is not to be reserved for the SRS, a physical resource is not reserved in the time slot, and the terminal device performs the rate matching on the PUSCH according to the time slot. A DMRS of the PUSCH after the rate matching on the last symbol moves forward one OFDM symbol compared with that of PUSCH without rate matching. For example, the DMRS occupies the last OFDM symbol in the time slot without SRS resource reservation, and the DMRS occupies the penultimate OFDM symbol in the time slot with resource reservation. In this way, the PUSCH after the rate matching on the last symbol will not have a resource conflict with aperiodic SRS signals sent by other terminals, thus avoiding mutual interferences. In addition, shifting DMRS may avoid resource conflicts between the DMRS and the SRS.

Another implementation is provided below. A network side uses DCI to schedule transmission of a PDSCH, and the DCI contains SRS resource reservation indication information. The SRS resource reservation indication information is used for indicating a number of OFDM symbols to be reserved for the SRS in a time slot where the PDSCH is located, and 2-bit information is used for respectively indicating 0, 1, 2, and 3 SRS symbols, 0 SRS symbol represents that no resource reservation is performed. The network side determines that the number of OFDM symbols to be reserved for the SRS is N through the indication information, and performs the rate matching on the PDSCH. In an implementation, the terminal device may move a subsequent PUCCH and GAP forward by N OFDM symbols, and reserve the last N OFDM symbols of the time slot for the SRS. In another implementation, the terminal may not move the PUCCH, reserve N OFDM symbols before the PUCCH for the SRS, and move the GAP between the PDSCH and the PUCCH forward by N OFDM symbols. That is, the terminal device may determine the location and/or length of the GAP according to the resource reservation indication information.

Therefore, in the signal transmission method in the implementations of the present application, the terminal device receives the downlink control information carrying the resource reservation indication information, and the resource reservation indication information indicates whether a physical resource is to be reserved in a time-domain resource unit. The terminal device determines the first physical resource used for transmitting the first signal in the time-domain resource unit according to the resource reservation indication information, or determines the second physical resource used for the uplink and downlink guard period in the time-domain resource unit according to the resource reservation indication information. Thus, the terminal device determines whether to reserve the physical resource according to the resource reservation indication information carried by the downlink control information sent by the network device, and reserves the physical resource only when reservation is needed, and the physical resource may be used for other signals when reservation is not needed, so that the terminal device can fully utilize the physical resource and improve the resource utilization rate.

Figure 6:
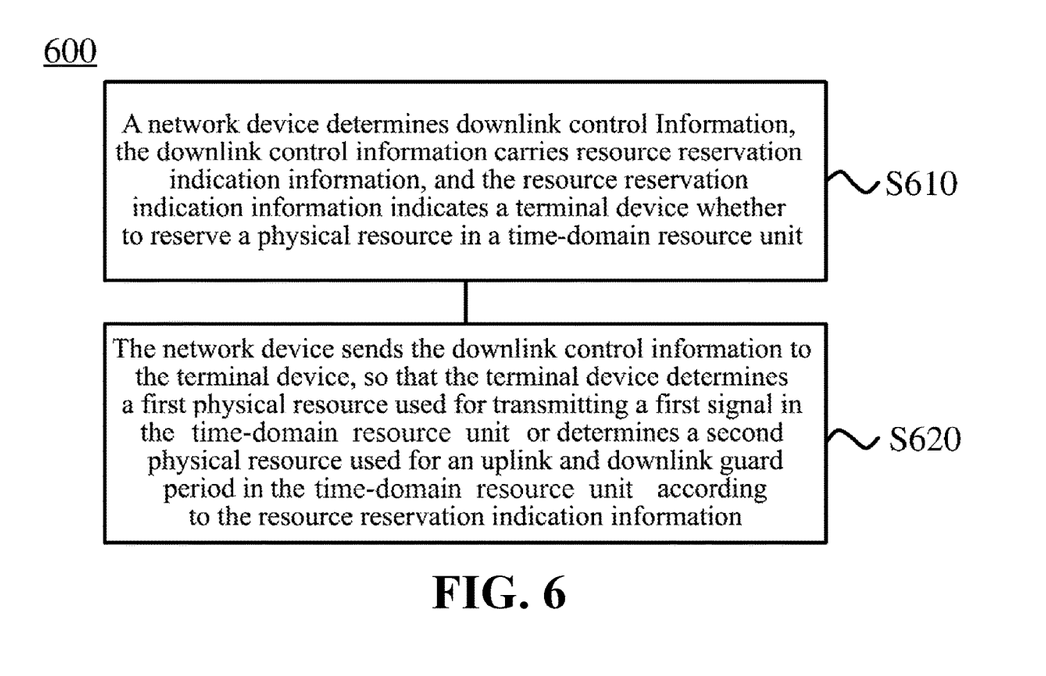
FIG. 6 is a schematic diagram of a signal transmission method according to yet another implementation of the present application.

FIG. 6 is a schematic flow chart of a signal transmission method 600 according to an implementation of the present application. The method 600 is performed by a network device, such as the network device 102 in FIG. 1. As shown in FIG. 6, the method 600 includes the following acts S610-S620.

In S610, the network device determines downlink control information (DCI), the downlink control information carries resource reservation indication information, and the resource reservation indication information indicates a terminal device whether a physical resource is to be reserved in a time-domain resource unit.

In S620, the network device sends the downlink control information to the terminal device, so that the terminal device determines a first physical resource used for transmitting a first signal in the time-domain resource unit according to the resource reservation indication information or determines a second physical resource used for an uplink and downlink guard period in the time-domain resource unit according to the resource reservation indication information.

The network device may configure the resource reservation indication information for the terminal device according to whether the terminal device needs to occupy the reserved physical resource to send signals or whether there is a resource conflict or the like, and send the resource reservation indication information to the terminal device through the downlink control information. The terminal device receives the downlink control information carrying the resource reservation indication information, and determines whether a physical resource needs to be reserved. When the physical resource needs to be reserved, the terminal device reserves the physical resource, when the physical resource does not need to be reserved, the physical resource may be used for other signals. In other words, the terminal device determines whether to reserve the physical resource according to the indication of the network device, thus the resource is reserved all the time in the traditional solution is avoided, thereby enabling the terminal device to fully utilize the physical resource and to improve the resource utilization rate.

Optionally, the DCI is used for indicating the terminal device to transmit the first signal through the time-domain resource unit.

Optionally, when the resource reservation indication information indicates the terminal device that a physical resource is to be reserved in the time-domain resource unit, the resource reservation indication information includes a location and/or a size of the physical resource that the terminal device is to reserve.

Optionally, the first signal is a demodulation reference signal (DMRS), and the first physical resource includes a location of an OFDM symbol for sending the DMRS signal and/or a number of OFDM symbols for sending the DMRS signal.

Optionally, the downlink control information is common downlink control information or group downlink control information. The common downlink control information is information transmitted in a common search space, and the group downlink control information is information transmitted to each terminal device in a terminal device set including multiple terminal devices.

Optionally, the reserved physical resource is a physical resource for transmitting an uplink reference signal or a downlink reference signal.

Optionally, the first signal is a physical uplink shared channel (PUSCH), or a physical uplink control channel (PUCCH), or a physical downlink control channel (PDCCH), or a physical downlink shared channel (PDSCH), or a sounding reference signal (SRS), or a channel state indication reference signal (CSI-RS), or a demodulation reference signal (DMRS), or a phase tracking signal (PTS), or a beam reference signal (BRS).

It should be understood that in implementations of the present application, interaction between the network device and the terminal device, and the related characteristics, functions, etc., described for the network device side correspond to the description for the terminal device side, and will not be repeated here for the sake of brevity.

It should be understood that in various implementations of the present application, values of sequence numbers in the aforementioned processes do not indicate an order of execution, and the order of execution of various processes should be determined by their functions and internal logics, and should not constitute any limitation on implementation processes of implementations of the present application.

Therefore, in the signal transmission method in the implementations of the present application, the network device determines the downlink control information carrying the resource reservation indication information that indicates whether a physical resource is to be reserved in the time-domain resource unit, and sends the downlink control information to the terminal device, so that the terminal device determines the first physical resource for transmitting the first signal in the time-domain resource unit according to the resource reservation indication information, or determines the second physical resource used for the uplink and downlink guard period in the time-domain resource unit according to the resource reservation indication information. Thus, the terminal device can determine whether to reserve the physical resource according to the resource reservation indication information carried by the downlink control information sent by the network device, the physical resource is reserved only when the physical resource need to be reserved, and the physical resource may be used for other signals when the physical resource do not need to be reserved, so that the terminal device can fully utilize the physical resource, and improve the resource utilization rate.

The signal transmission method according to the implementations of the present application has been described in detail above, and the network device and the terminal device according to implementations of the present application will be described below. It should be understood that the network device and the terminal device in the implementations of the present application may perform various methods of the aforementioned implementations of the present application, that is, specific working processes of following devices may refer to the corresponding processes in the aforementioned method implementations.

Figure 7:
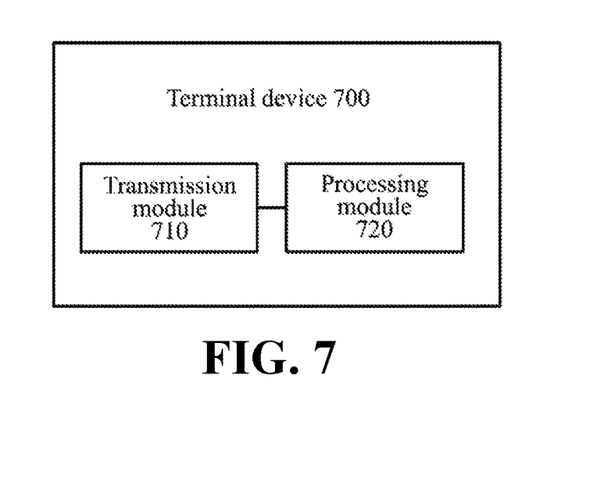
FIG. 7 is a schematic block diagram of a terminal device according to an implementation of the present application.

FIG. 7 is a schematic block diagram of a terminal device 700 according to an implementation of the present application. As shown in FIG. 7, the terminal device 700 includes a transmission module 710 and a processing module 720.

The transmission module 710 is used for receiving downlink control information (DCI). The DCI carries resource reservation indication information, and the resource reservation indication information indicates the terminal device whether a physical resource is to be reserved in a time-domain resource unit.

The processing module 720 is used for determining a first physical resource used for transmitting a first signal in the time-domain resource unit according to the resource reservation indication information, or determining a second physical resource used for an uplink and downlink guard period in the time-domain resource unit according to the resource reservation indication information.

Optionally, the DCI is used for indicating the terminal device to transmit the first signal through the time-domain resource unit.

Optionally, when the resource reservation indication information indicates the terminal device that a physical resource is to be reserved in the time-domain resource unit, the resource reservation indication information includes a location and/or a size of the physical resource that the terminal device is to reserve.

Optionally, when the resource reservation indication information indicates the terminal device a physical resource is not to be reserved in the time-domain resource unit, the processing module 720 is specifically used for determining the first physical resource or the second physical resource in the time-domain resource unit.

Optionally, when the resource reservation indication information indicates the terminal device that a physical resource is to be reserved in the time-domain resource unit, the processing module 720 is specifically used for determining a physical resource to be reserved in the time-domain resource unit according to the resource reservation indication information; and determining the first physical resource or the second physical resource in other physical resources except the reserved physical resource in the time-domain resource unit.

Optionally, the first signal is a demodulation reference signal (DMRS), and the processing module is specifically used for determining the first physical resource including a location of an OFDM symbol for sending the DMRS signal and/or a number of OFDM symbols for sending the DMRS signal in other physical resources except the reserved physical resource in the time-domain resource unit.

Optionally, the downlink control information is common downlink control information or group downlink control information. The common downlink control information is information transmitted in a common search space. The group downlink control information is information transmitted to each terminal device in a terminal device set including multiple terminal devices.

Optionally, the processing module 720 is further used for performing rate matching processing or puncturing processing on the first signal according to the first physical resource. The transmission module 710 is further used for transmitting the first signal on which the rate matching processing or puncturing processing is performed.

Optionally, the reserved physical resource is a physical resource for transmitting an uplink reference signal or a downlink reference signal.

Optionally, the first signal is a physical uplink shared channel (PUSCH), or a physical uplink control channel (PUCCH), or a physical downlink control channel (PDCCH), or a physical downlink shared channel (PDSCH), or a sounding reference signal (SRS), or a channel state indication reference signal (CSI-RS), or a demodulation reference signal (DMRS), or a phase tracking signal (PTS), or a beam reference signal (BRS).

Optionally, the processing module 720 is specifically used for determining a location and/or a length of the uplink and downlink guard period in the time-domain resource unit according to the resource reservation indication information.

Therefore, the terminal device in the implementations of the present application receives the downlink control information carrying the resource reservation indication information, and the resource reservation indication information indicates whether a physical resource is to be reserved in a time-domain resource unit; and the terminal device determines the first physical resource used for transmitting the first signal in the time-domain resource unit according to the resource reservation indication information, or determines the second physical resource used for the uplink and downlink guard period in the time-domain resource unit, according to the resource reservation indication information. Thus, the terminal device determines whether to reserve the physical resource according to the resource reservation indication information carried by the downlink control information sent by the network device, and reserves the physical resource only when reservation is needed, and the physical resource may be used for other signals when reservation is not needed, so that the terminal device can fully utilize the physical resource and improve the resource utilization rate.

Figure 8:
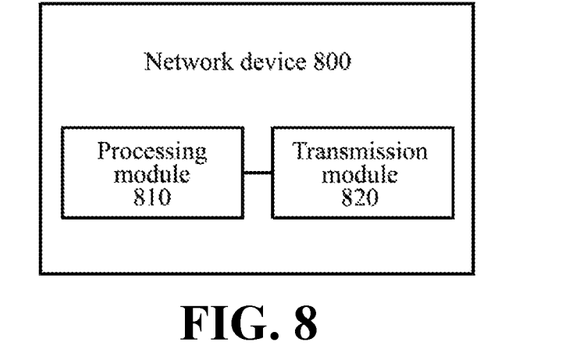
FIG. 8 is a schematic block diagram of a network device according to an implementation of the present application.

FIG. 8 illustrates a schematic block diagram of a network device 800 according to an implementation of the present application. As shown in FIG. 8, the network device 800 includes a processing module 810 and a transmission module 820.

The processing module 810 is used for determining downlink control information (DCI). The downlink control information carries resource reservation indication information, and the resource reservation indication information indicates whether a terminal device is to reserve a physical resource in a time-domain resource unit.

The transmission module 820 is used for sending the downlink control information determined by the processing module 810 to the terminal device, so that the terminal device determines a first physical resource used for transmitting a first signal in the time-domain resource unit according to the resource reservation indication information, or determines a second physical resource used for an uplink and downlink guard period in the time-domain resource unit according to the resource reservation indication information.

Optionally, the DCI is used for indicating the terminal device to transmit the first signal through the time-domain resource unit.

Optionally, when the resource reservation indication information indicates the terminal device that is a physical resource is to be reserved in the time-domain resource unit, the resource reservation indication information includes a location and/or a size of the physical resource that the terminal device is to reserve.

Optionally, the first signal is a demodulation reference signal (DMRS), and the first physical resource includes a location of an OFDM symbol for sending the DMRS signal and/or a number of OFDM symbols for sending the DMRS signal.

Optionally, the downlink control information is common downlink control information or group downlink control information. The common downlink control information is information transmitted in a common search space, and the group downlink control information is information transmitted to each terminal device in a terminal device set including multiple terminal devices.

Optionally, the reserved physical resource is a physical resource for transmitting an uplink reference signal or a downlink reference signal.

Optionally, the first signal is a physical uplink shared channel (PUSCH), or a physical uplink control channel (PUCCH), or a physical downlink control channel (PDCCH), or a physical downlink shared channel (PDSCH), or a sounding reference signal (SRS), or a channel state indication reference signal (CSI-RS), or a demodulation reference signal (DMRS), or a phase tracking signal (PTS), or a beam reference signal (BRS).

Therefore, the network device in the implementations of the present application determines the downlink control information carrying the resource reservation indication information indicating whether a physical resource is to be reserved in a time-domain resource unit, and sends the downlink control information to the terminal device, so that the terminal device determines the first physical resource for transmitting the first signal in the time-domain resource unit according to the resource reservation indication information, or determines the second physical resource used for the uplink and downlink guard period in the time-domain resource unit according to the resource reservation indication information. Thus, the terminal device may determine whether to reserve the physical resource according to the resource reservation indication information carried by the downlink control information sent by the network device. The physical resource is reserved only when the physical resource need to be reserved, and the physical resource may be used for other signals when the physical resource does not need to be reserved, so that the terminal device can fully utilize the physical resource, and improve the resource utilization rate.

Figure 9:
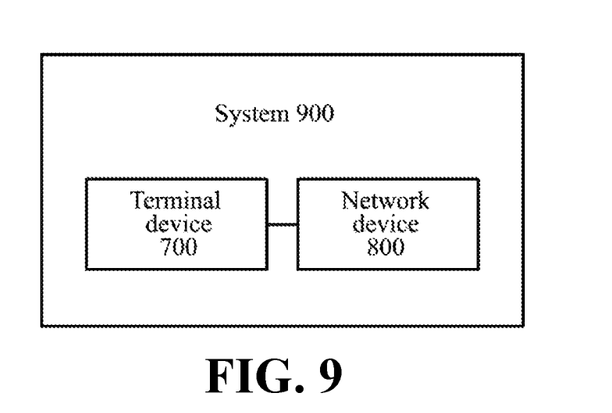
FIG. 9 is a schematic block diagram of a system according to an implementation of the present application.

FIG. 9 illustrates a schematic block diagram of a signal transmission system 900 according to an implementation of the present application. The system 900 includes the terminal device 700 in the aforementioned implementations of the present application and the network device 800 in the aforementioned implementations of the present application.

Figure 10:
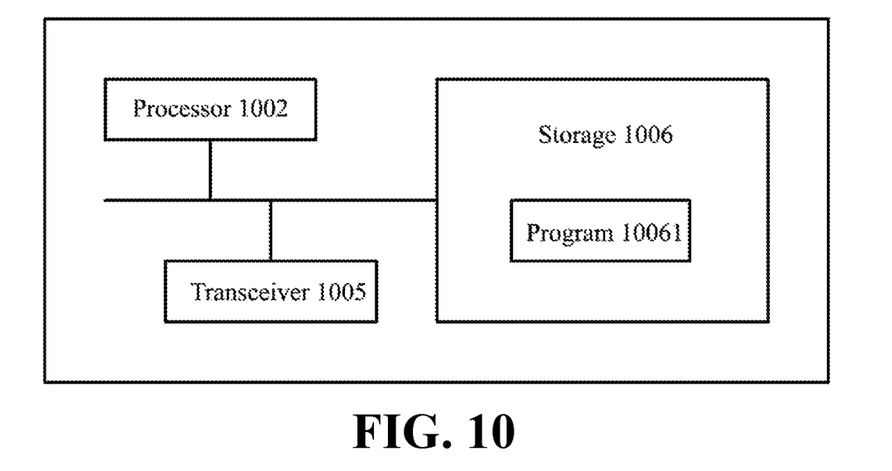
FIG. 10 is a schematic diagram of structure of a terminal device according to an implementation of the present application.

FIG. 10 illustrates a schematic diagram of structure of a terminal device according to an implementation of the present application. As shown in FIG. 10, the terminal device includes at least one processor 1002 (e.g., a general purpose processor CPU, a digital signal processor (DSP), an application specific integrated circuit (ASIC), or a field programmable gate array (FPGA) with computing and processing capabilities), and the processor 1002 is used for managing and scheduling various modules and components within the terminal device. The processing module 720 in the implementation shown in FIG. 7 may be implemented by the processor 1002. The terminal device also includes at least one transceiver 1005 (receiver/transmitter) and a storage 1006. The transmission module 710 in the implementation shown in FIG. 7 may be implemented by the transceiver 1005. The various components in the transmission module 710 communicate with each other through internal connection paths to transmit control and/or data signals.

The method disclosed in the above implementations of the present application may be applied to the processor 1002, or used for executing an executable module stored in the storage 1006, such as, a computer program. The storage 1006 may include a high speed random access memory (RAM), or may include a non-volatile memory. The storage 1006 may include a read-only memory and a random access memory, and provide required signalings or data, programs, etc. to the processor. A part of the storage may include a non-volatile random access memory (NVRAM). Communication connection with at least one other network element is realized through at least one transceiver 1005 (which may be wired or wireless).

In some implementations, the storage 1006 stores a program 10061, and the processor 1002 executes the program 10061 for performing the following operations: receiving downlink control information (DCI) through the transceiver 1005, wherein the DCI carries resource reservation indication information, and the resource reservation indication information indicates the terminal device whether a physical resource is to be reserved in a time-domain resource unit; determining a first physical resource used for transmitting a first signal in the time-domain resource unit according to the resource reservation indication information, or determining a second physical resource used for an uplink and downlink guard period in the time-domain resource unit according to the resource reservation indication information.

It should be noted that the terminal device may be specifically the terminal device in the implementation shown in FIG. 7, and may be used for executing various acts and/or processes corresponding to the terminal device in the method implementation shown in FIG. 2.

It can be seen from the above technical schemes provided by the implementations of the present application that, the terminal device receives the downlink control information carrying the resource reservation indication information, and the resource reservation indication information indicates whether a physical resource is to be reserved in a time-domain resource unit. The terminal device determines the first physical resource used for transmitting the first signal in the time-domain resource unit according to the resource reservation indication information, or determines the second physical resource used for the uplink and downlink guard period in the time-domain resource unit according to the resource reservation indication information. Thus, the terminal device determines whether to reserve the physical resource according to the resource reservation indication information carried by the downlink control information sent by the network device, and reserves the physical resource only when reservation is needed, and the physical resource may be used for other signals when reservation is not needed, so that the terminal device can fully utilize the physical resource and improve the resource utilization rate.

Figure 11:
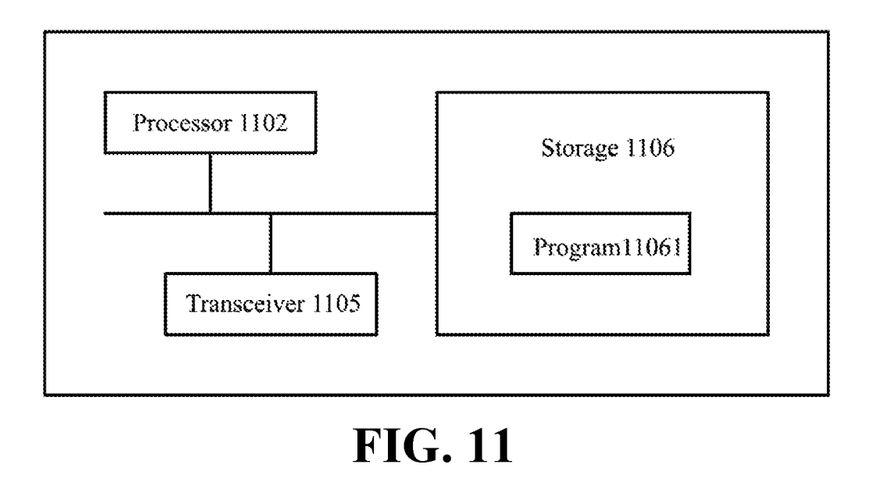
FIG. 11 is a schematic diagram of structure of a network device according to an implementation of the present application.

FIG. 11 illustrates a schematic diagram of structure of a network device according to an implementation of the present application. As shown in FIG. 11, the network device includes at least one processor 1102 (e.g., a general purpose processor CPU, a digital signal processor (DSP), an application specific integrated circuit (ASIC), or a field programmable gate array (FPGA) with computing and processing capabilities), the processor 1102 is used for managing and scheduling various modules and components within the network device. The processing module 810 in the implementation shown in FIG. 8 may be implemented by the processor 1102. The network device includes at least one transceiver 1105 (receiver/transmitter 1105) and a storage 1106. The various components of the network device communicate with each other through internal connection paths to transmit control and/or data signals.

The method disclosed in the above implementations of the present application may be applied to the processor 1102, or used for executing an executable module stored in the storage 1106, such as a computer program. The storage 1106 may include a high speed random access memory (RAM), or may include a non-volatile memory. The storage 1106 may include a read-only memory and a random access memory, and provide required signalings, data, or programs, etc., to the processor. A part of the storage may include a non-volatile random access memory (NVRAM). Communication connection with at least one other network element is realized through the at least one transceiver 1105 (which may be wired or wireless).

In some implementations, the storage 1106 stores a program 11061, and the processor 1102 executes the program 11061 for performing the following operations: determining downlink control information (DCI), wherein the downlink control information carries resource reservation indication information, and the resource reservation indication information indicates the terminal device whether a physical resource is to be reserved in a time-domain resource unit; sending the downlink control information to the terminal device through the transceiver 1105, so that the terminal device determines a first physical resource used for transmitting a first signal in the time-domain resource unit according to the resource reservation indication information, or determines a second physical resource used for an uplink and downlink guard period in the time-domain resource unit according to the resource reservation indication information.

It should be noted that the network device may be specifically the network device in the implementation shown in FIG. 8, and may be used for executing various acts and/or processes corresponding to the network device in the method implementation shown in FIG. 6.

It can be seen from the above technical solutions provided by the implementations of the present application, the network device determines the downlink control information carrying the resource reservation indication information indicating whether a physical resource is to be reserved in a time-domain resource unit, and sends the downlink control information to the terminal device, so that the terminal device determines the first physical resource for transmitting the first signal in the time-domain resource unit according to the resource reservation indication information, or determines the second physical resource used for the uplink and downlink guard period in the time-domain resource unit. Thus, the terminal device may determine whether to reserve the physical resource according to the resource reservation indication information carried by the downlink control information sent by the network device. The physical resource is reserved only when the physical resource need to be reserved, and the physical resource may be used for other signals when the physical resource does not need to be reserved, so that the terminal device can fully utilize the physical resource, and improve the resource utilization rate.

An implementation of the present application also provides a computer storage medium that may store program instructions for instructing any of the above methods.

Optionally, the storage medium may specifically be a storage 1006 or 1106.

The term "and/or" in this document is merely an association relationship describing associated objects, indicating that there may be three relationships, for example, A and/or B may indicate three situations: A alone, A and B, and B alone. In addition, the character "/" in this document generally indicates that the objects before and after the character have an "or" relationship.

It should be understood that in various implementations of the present application, values of sequence numbers in the aforementioned processes do not indicate an order of execution, and the order of execution of various processes should be determined by their functions and internal logics, and should not constitute any limitation on implementation processes of implementations of the present application.

Those of ordinary skill in the art will recognize that the exemplary units and algorithm acts described in connection with the implementations disclosed herein can be implemented in electronic hardware, or a combination of computer software and electronic hardware. Whether these functions are implemented in hardware or software depends on the specific application and design constraints of the technical scheme. Skilled artisans may use different methods to implement the described functions in respect to each particular application, but such implementation should not be considered to be beyond the scope of the present application.

Those skilled in the art may clearly understand that for convenience and conciseness of description, the specific working processes of the system, apparatus and unit described above may refer to the corresponding processes in the aforementioned implementations of methods, and details are not described herein again.

In several implementations provided by the present application, it should be understood that the disclosed systems, devices and methods may be implemented in other ways. For example, the device implementations described above are only illustrative, for example, the division of the units is only a logical function division, and there may be other division manners in actual implementation, for example, multiple units or components may be combined or integrated into another system, or some features may be ignored or not executed. On the other hand, the mutual coupling or direct coupling or communication connection shown or discussed may be indirect coupling or communication connection through some interface, device or unit, and may be in electrical, mechanical or other forms.

The units described as separate components may or may not be physically separated, and a component shown as a unit may or may not be a physical unit, i.e., it may be located in one place or may be distributed over multiple network units. Some or all of the components can be selected according to actual needs to achieve the purpose of the implementation of the present application.

In addition, various functional units in various implementations of the present application may be integrated in one processing unit, or the various units may be physically separate, or two or more units may be integrated in one unit.

The function units may be stored in a computer readable storage medium if realized in a form of software functional units and sold or used as a separate product. Based on this understanding, the technical solution of the present application, in essence, or the part contributing to the prior art, or the part of the technical solution, may be embodied in the form of a software product stored in a storage medium, including a variety of instructions for causing a computer device (which may be a personal computer, a server, or a network device) to perform all or part of the acts of the method described in various implementations of the present application. The aforementioned storage medium includes various media capable of storing program codes, such as a U disk, a mobile hard disk, a read-only memory (ROM), a random access memory (RAM), a magnetic disk, or an optical disk.

What are described above are merely exemplary implementations of the present application, but the protection scope of the present application is not limited thereto. Any variation or substation that can be easily conceived by a person skilled in the art within the technical scope disclosed by the present application shall be included within the protection scope of the present application. Therefore, the protection scope of the present application shall be the protection scope defined by the claims.

What is claimed is:

1. A method for signal transmission, comprising:
   receiving, by a terminal device, downlink control information (DCI), wherein the DCI carries resource reservation indication information, and the resource reservation indication information indicates to the terminal device whether one of a plurality of physical resources is to be reserved in a time-domain resource unit; and
   determining, by the terminal device, a first physical resource used for transmitting a first signal in the time-domain resource unit according to the resource reservation indication information, or determining a second physical resource used for an uplink and downlink guard period in the time-domain resource unit according to the resource reservation indication information,
   wherein the downlink control information is common downlink control information, the common downlink control information is information transmitted in a common search space of a downlink control channel.

2. The method according to claim 1, wherein the DCI is used for indicating the terminal device to transmit the first signal through the time-domain resource unit.

3. The method according to claim 1, wherein when the resource reservation indication information indicates to the terminal device that one of the plurality of physical resources is to be reserved in the time-domain resource unit, the resource reservation indication information comprises a location of the physical resource that the terminal device is to reserve, or a size of the physical resource that the terminal device is to reserve, or a location of the physical resource that the terminal device is to reserve and a size of the physical resource that the terminal device is to reserve.

4. The method according to claim 1, wherein when the resource reservation indication information indicates to the terminal device that one of the plurality of physical resources is to be reserved in the time-domain resource unit, determining, by the terminal device, the first physical resource used for transmitting the first signal in the time-domain resource unit, or determining the second physical resource used for the uplink and downlink guard period in the time-domain resource unit according to the resource reservation indication information, comprises:
   determining, by the terminal device, a physical resource to be reserved in the time-domain resource unit according to the resource reservation indication information; and
   determining, by the terminal device, the first physical resource or the second physical resource in other physical resources except the reserved physical resource in the time-domain resource unit.

5. The method according to claim 1, wherein the method further comprises:

performing, by the terminal device, rate matching processing or puncturing processing on the first signal according to the first physical resource; and transmitting, by the terminal device, the first signal on which the rate matching processing or puncturing processing is performed.

6. The method according to claim 1, wherein the first signal is a physical uplink shared channel (PUSCH), or a physical uplink control channel (PUCCH), or a physical downlink control channel (PDCCH), or a physical downlink shared channel (PDSCH), or a sounding reference signal (SRS), or a channel state indication reference signal (CSI-RS), or a demodulation reference signal (DMRS), or a phase tracking signal (PTS), or a beam reference signal (BRS).

7. The method according to claim 1, wherein determining, by the terminal device, the second physical resource used for the uplink and downlink guard period in the time-domain resource unit according to the resource reservation indication information, comprises:

determining, by the terminal device, a location of the uplink and downlink guard period, or a length of the uplink and downlink guard period, or a location of the uplink and downlink guard period and a length of the uplink and downlink guard period, in the time-domain resource unit according to the resource reservation indication information.

8. A method for signal transmission, comprising:

determining, by a network device, downlink control information (DCI), wherein the downlink control information carries resource reservation indication information, and the resource reservation indication information indicates to a terminal device whether one of a plurality of physical resources is to be reserved in a time-domain resource unit; and sending, by the network device, the downlink control information to the terminal device, so that the terminal device determines a first physical resource used for transmitting a first signal in the time-domain resource unit according to the resource reservation indication information, or determines a second physical resource used for an uplink and downlink guard period in the time-domain resource unit according to the resource reservation indication information, wherein the downlink control information is common downlink control information, the common downlink control information is information transmitted in a common search space.

9. The method according to claim 8, wherein when the resource reservation indication information indicates to the terminal device that one of the plurality of physical resources is to be reserved in the time-domain resource unit, the resource reservation indication information comprises a location of the physical resource that the terminal device is to reserve, or a size of the physical resource that the terminal device is to reserve, or a location of the physical resource that the terminal device is to reserve and a size of the physical resource that the terminal device is to reserve.

10. A terminal device comprising:

a transceiver, used for receiving downlink control information (DCI), wherein the DCI carries resource reservation indication information, and the resource reservation indication information indicates to the terminal device whether one of a plurality of physical resources is to be reserved in a time-domain resource unit; and a processor, used for determining a first physical resource used for transmitting a first signal in the time-domain resource unit according to the resource reservation indication information, or determining a second physical resource used for an uplink and downlink guard period in the time-domain resource unit according to the resource reservation indication information, wherein the downlink control information is common downlink control information, the common downlink control information is information transmitted in a common search space.

11. The terminal device according to claim 10, wherein the DCI is used for indicating the terminal device to transmit the first signal through the time-domain resource unit.

12. The terminal device according to claim 10, wherein when the resource reservation indication information indicates to the terminal device that one of the plurality of physical resources is to be reserved in the time-domain resource unit, the resource reservation indication information comprises a location of the physical resource that the terminal device is to reserve, or a size of the physical resource that the terminal device is to reserve, or a location of the physical resource that the terminal device is to reserve and a size of the physical resource that the terminal device is to reserve.

13. The terminal device according to claim 10, wherein when the resource reservation indication information indicates to the terminal device that one of the plurality of physical resources is to be reserved in the time-domain resource unit, the processor is specifically used for:

determining a physical resource to be reserved in the time-domain resource unit according to the resource reservation indication information; and determining the first physical resource or the second physical resource in other physical resources except the reserved physical resource in the time-domain resource unit.

14. The terminal device according to claim 10, wherein the processor is further used for performing rate matching processing or puncturing processing on the first signal according to the first physical resource; and the transceiver is further used for transmitting the first signal on which the rate matching processing or puncturing processing is performed.

15. The terminal device according to claim 10, wherein the first signal is a physical uplink shared channel (PUSCH), or a physical uplink control channel (PUCCH), or a physical downlink control channel (PDCCH), or a physical downlink shared channel (PDSCH), or a sounding reference signal (SRS), or a channel state indication reference signal (CSI-RS), or a demodulation reference signal (DMRS), or a phase tracking signal (PTS), or a beam reference signal (BRS).

16. The terminal device according to claim 10, wherein the processor is specifically used for:

determining a location of the uplink and downlink guard period, or a length of the uplink and downlink guard period, or a location of the uplink and downlink guard period and a length of the uplink and downlink guard period, in the time-domain resource unit according to the resource reservation indication information.

17. A network device for signal transmission, comprising:

a processor, used for determining downlink control information (DCI), wherein the downlink control information carries resource reservation indication information, and the resource reservation indication information indicates to a terminal device whether one of a plurality of physical resources is to be reserved in a time-domain resource unit; and a transceiver, used for sending downlink control information determined by the processor to the terminal device, so that the terminal device determines a first physical resource used for transmitting a first signal in the time-domain resource unit according to the resource reservation indication information, or determines a second physical resource used for an uplink and downlink guard period in the time-domain resource unit according to the resource reservation indication information, wherein the downlink control information is common downlink control information, the common downlink control information is information transmitted in a common search space.

18. The network device according to claim 17, wherein when the resource reservation indication information indicates to the terminal device whether one of the plurality of physical resources is to be reserved in the time-domain resource unit, the resource reservation indication information comprises a location of the physical resource that the terminal device is to reserve, or a size of the physical resource that the terminal device is to reserve, or a location of the physical resource that the terminal device is to reserve and a size of the physical resource that the terminal device is to reserve.

\* \* \* \* \*